(12) United States Patent
Lee

(10) Patent No.: US 10,991,959 B2
(45) Date of Patent: Apr. 27, 2021

(54) FUEL CELL STACK

(71) Applicants: HYUNDAI MOTOR COMPANY, Seoul (KR); KIA MOTORS CORPORATION, Seoul (KR)

(72) Inventor: Sung Ho Lee, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/751,350

(22) Filed: Jan. 24, 2020

(65) Prior Publication Data

US 2020/0161679 A1 May 21, 2020

Related U.S. Application Data

(62) Division of application No. 15/828,116, filed on Nov. 30, 2017, now Pat. No. 10,586,990.

(30) Foreign Application Priority Data

May 26, 2017 (KR) .................. 10-2017-0065596

(51) Int. Cl.
*H01M 8/04119* (2016.01)
*H01M 8/0263* (2016.01)
(Continued)

(52) U.S. Cl.
CPC ....... *H01M 8/04164* (2013.01); *H01M 8/006* (2013.01); *H01M 8/0263* (2013.01);
(Continued)

(58) Field of Classification Search
CPC ....... H01M 2008/1095; H01M 2/0212; H01M 2/266; H01M 8/006; H01M 8/0263;
(Continued)

(56) References Cited

U.S. PATENT DOCUMENTS 7,445,866 B2 11/2008 Sugiura et al.
9,023,543 B2 * 5/2015 Chin .................. H01M 8/2465
429/414

(Continued)

FOREIGN PATENT DOCUMENTS

KR 10-0700073 B1 3/2007
KR 10-1417454 B1 7/2014

OTHER PUBLICATIONS

Notice of Allowance issued in corresponding U.S. Appl. No. 15/828,116 dated Dec. 27, 2019.

(Continued)

*Primary Examiner* — Carlos Barcena
(74) *Attorney, Agent, or Firm* — Morgan, Lewis & Bockius LLP

(57) ABSTRACT

A fuel cell stack includes: a cell stacked body in which a plurality of fuel cells are stacked in multiple layers; and an end plate by which the plurality of fuel cells are fastened, the end plate including an open end plate disposed at one end of the cell stacked body and a closed end plate disposed at another end of the cell stacked body, wherein the open end plate includes a gas inlet delivering a reactant gas supplied from an outside of the fuel cell stack to the cell stacked body, a gas outlet discharging the reactant gas having passed through the cell stacked body to the outside of the fuel cell stack, and a bypass channel connecting the gas inlet to the gas outlet to guide condensed water introduced to the gas inlet to the gas outlet, the bypass channel partially curved to allow the condensed water to be collected.

8 Claims, 13 Drawing Sheets

(51) Int. Cl.
    *H01M 8/2483*     (2016.01)
    *H01M 8/00*     (2016.01)
    *H01M 8/2457*     (2016.01)
    *H01M 8/241*     (2016.01)
    *H01M 50/54*     (2021.01)
    *H01M 50/557*     (2021.01)
    *H01M 8/1018*     (2016.01)

(52) U.S. Cl.
    CPC ....... *H01M 8/04126* (2013.01); *H01M 8/241* (2013.01); *H01M 8/2457* (2016.02); *H01M 8/2483* (2016.02); *H01M 50/54* (2021.01); *H01M 50/557* (2021.01); *H01M 2008/1095* (2013.01)

(58) Field of Classification Search
    CPC ......... H01M 8/04126; H01M 8/04164; H01M 8/241; H01M 8/2457; H01M 8/2483
    See application file for complete search history.

(56) References Cited

U.S. PATENT DOCUMENTS

2003/0215693 A1     11/2003   Asai et al.
2010/0068599 A1     3/2010   Furusawa et al.

OTHER PUBLICATIONS

Office Action issued in corresponding U.S. Appl. No. 15/828,116 dated Aug. 28, 2019.

* cited by examiner

FUEL CELL STACK

CROSS-REFERENCE TO RELATED APPLICATION

This application is the divisional of U.S. patent application Ser. No. 15/828,116 filed on Nov. 30, 2017, which is based on and claims the benefit of priority to Korean Patent Application No. 10-2017-0065596, filed on May 26, 2017, with the Korean Intellectual Property Office, the disclosures of which are incorporated herein in their entirety by reference.

TECHNICAL FIELD

The present disclosure relates to a fuel cell stack.

BACKGROUND

A fuel cell that is a main power supply source of a fuel cell system is a device that produces electricity while producing water by receiving hydrogen, which is a fuel, and oxygen, which is an oxidizing agent. High purity hydrogen is supplied from a hydrogen storage tank to an anode (fuel electrode) of a fuel cell stack, and air in the atmosphere containing, e.g., oxygen, is directly supplied to a cathode (air electrode) of the fuel cell stack by an air supply device such as an air compressor.

Hydrogen supplied to the anode is split into hydrogen ions (protons) and electrons by a catalyst of the anode, and the protons are conducted through a polymer electrolyte membrane to the cathode. Oxygen in the air supplied to the cathode is combined with the electrons which have traveled to the cathode through an external circuit to form water and generate electrical energy.

As the polymer electrolyte membrane is sufficiently wet with moisture, ion conductivity increases and loss due to resistance decreases. In addition, when the supply of a reactant gas having a low relative humidity continues, the polymer electrolyte membrane becomes dry and may no longer be used. Therefore, humidification of the reactant gas is essential in the fuel cell system, and thus the fuel cell system may generally be provided with a humidifier capable of humidifying the reactant gas.

Meanwhile, the reactant gas humidified by the humidifier may be supplied to the fuel cell stack through a gas supply line. In the gas supply line, moisture contained in the reactant gas may be condensed due to low ambient temperature, to foam condensed water. In addition, the condensed water generated during the humidification of the reactant gas in the humidifier may flow into the gas supply line together with the reactant gas. The condensed water may flow, together with the reactant gas, into the interior of the fuel cell stack, and then flow into fuel cells. Most of the condensed water flowing into the interior of the fuel cell stack may flow intensively into a fuel cell located at an inlet side of the fuel cell stack. In the inlet side fuel cell of the fuel cell stack, continuous presence of excessive condensed water may frequently cause degradation of the anode and the cathode (hereinafter referred to as the "electrodes"). The degradation of the electrodes is a key factor in decreasing the durability of the fuel cell system.

Therefore, a conventional fuel cell stack includes a dummy cell disposed between the inlet side fuel cell and an end plate in order to prevent the degradation of the electrodes. The dummy cell includes a gas supply manifold guiding the reactant gas supplied from the outside of the fuel cell stack to the fuel cells, a gas exhaust manifold guiding the reactant gas having passed through the fuel cells to the outside, and a bypass channel connecting the gas supply manifold to the gas exhaust manifold to guide the condensed water passing through the gas supply manifold to the gas exhaust manifold. Due to the presence of the dummy cell, the condensed water introduced into the interior of the fuel cell stack fails to enter the fuel cells, and is discharged to the outside of the fuel cell stack through the bypass channel of the dummy cell. However, not only the condensed water but also part of the reactant gas introduced into the interior of the fuel cell stack may be forced to flow into the bypass channel.

Therefore, in the conventional fuel cell stack, part of the reactant gas may be discharged to the outside of the fuel cell stack through the bypass channel without reaching the fuel cells, and thus the efficiency of the fuel cell system may be lowered.

SUMMARY

The present disclosure has been made to solve the above mentioned problems occurring in the prior art while advantages achieved by the prior art are maintained intact.

An aspect of the present disclosure provides a fuel cell stack having a novel structure for preventing loss of a reactant gas through a bypass channel that is designed to discharge condensed water introduced into an interior of the fuel cell stack to an outside of the fuel cell stack.

According to an aspect of the present disclosure, a fuel cell stack includes: a cell stacked body in which a plurality of fuel cells are stacked in multiple layers; an end plate by which the plurality of fuel cells are fastened; and a dummy cell interposed between the cell stacked body and the end plate, in which the end plate includes a gas inlet through which a reactant gas supplied from an outside of the fuel cell stack is introduced, and a gas outlet through which the reactant gas is discharged to the outside, and the dummy cell includes a gas supply manifold delivering the reactant gas having passed through the gas inlet to the cell stacked body, a gas exhaust manifold delivering the reactant gas having passed through the cell stacked body to the gas outlet, and a bypass channel connecting the gas supply manifold to the gas exhaust manifold to guide condensed water introduced to the gas supply manifold to the gas exhaust manifold and being partially curved to allow the condensed water to be collected.

The bypass channel may include one or more valley portions curved to allow the condensed water to be collected.

The gas exhaust manifold may be spaced apart from the gas supply manifold by a predetermined distance in the direction of gravity, and each of the one or more valley portions may be concavely curved in a direction of gravity.

The bypass channel may further include one or more ridge portions convexly curved in an opposite direction of gravity.

Each of the one or more ridge portions may be positioned between the one or more valley portions or between any one of the one or more valley portions and the gas exhaust manifold.

The one or more valley portions and the one or more ridge portions may be positioned such that an inflection point of a valley portion is spaced apart from an inflection point of a ridge portion by a predetermined distance in the direction of gravity.

The bypass channel may further include an inflow channel provided between the gas supply manifold and the one or more valley portions to guide the condensed water to the one or more valley portions, and an outflow channel provided between the one or more valley portions and the gas exhaust manifold to guide the condensed water to the gas exhaust manifold.

The inflow channel and the outflow channel may be downwardly inclined and upwardly inclined in the direction of gravity.

The inflow channel may include a plurality of unit inflow channels parallel to each other between the gas supply manifold and the one or more valley portions.

A sum of sectional areas of all of the plurality of unit inflow channels may be greater than a sectional area of each of the one or more valley portions.

The outflow channel may include a plurality of unit outflow channels parallel to each other between the one or more valley portions and the gas exhaust manifold.

A sum of sectional areas of all of the plurality of unit outflow channels may be greater than a sectional area of each of the one or more valley portions.

Each of the one or more valley portions may include a plurality of unit valley portions parallel to each other.

A sum of sectional areas of all of the plurality of unit valley portions may be greater than a sectional area of the inflow channel.

The gas inlet may include a hydrogen inlet through which hydrogen supplied from the outside is introduced, the gas outlet may include a hydrogen outlet through which the hydrogen is discharged to the outside, the gas supply manifold may include a hydrogen supply manifold delivering the hydrogen having passed through the hydrogen inlet to the cell stacked body, the gas exhaust manifold may include a hydrogen exhaust manifold delivering the hydrogen having passed through the cell stacked body to the hydrogen outlet, and the bypass channel may include a first bypass channel provided in one surface of the dummy cell to connect the hydrogen supply manifold to the hydrogen exhaust manifold.

The gas inlet may include an air inlet through which air supplied from the outside is introduced, the gas outlet may include an air outlet through which the air is discharged to the outside, the gas supply manifold may include an air supply manifold delivering the air having passed through the air inlet to the cell stacked body, the gas exhaust manifold may include an air exhaust manifold delivering the air having passed through the cell stacked body to the air outlet, and the bypass channel may include a second bypass channel provided in another surface of the dummy cell to connect the air supply manifold to the air exhaust manifold.

The dummy cell may include a gas diffusion layer, a first bipolar plate attached to one surface of the gas diffusion layer, and a second bipolar plate attached to another surface of the gas diffusion layer. The hydrogen supply manifold, the air supply manifold, the hydrogen exhaust manifold, and the air exhaust manifold may be provided in each of the first bipolar plate and the second bipolar plate. The first bypass channel may be provided in one surface of one bipolar plate of the first and second bipolar plates, and the second bypass channel may be provided in one surface of another bipolar plate of the first and second bipolar plates.

According to another aspect of the present disclosure, a fuel cell stack includes: a cell stacked body in which a plurality of fuel cells are stacked in multiple layers; and an end plate by which the plurality of fuel cells are fastened, the end plate including an open end plate disposed at one end of the cell stacked body and a closed end plate disposed at another end of the cell stacked body, wherein the open end plate includes a gas inlet delivering a reactant gas supplied from an outside of the fuel cell stack to the cell stacked body, a gas outlet discharging the reactant gas having passed through the cell stacked body to the outside, and a bypass channel connecting the gas inlet to the gas outlet to guide condensed water introduced to the gas inlet to the gas outlet and being partially curved to allow the condensed water to be collected.

The bypass channel may include one or more valley portions curved to allow the condensed water to be collected.

The gas outlet may be spaced apart from the gas inlet by a predetermined distance in a direction of gravity, and each of the one or more valley portions may be concavely curved in the direction of gravity.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
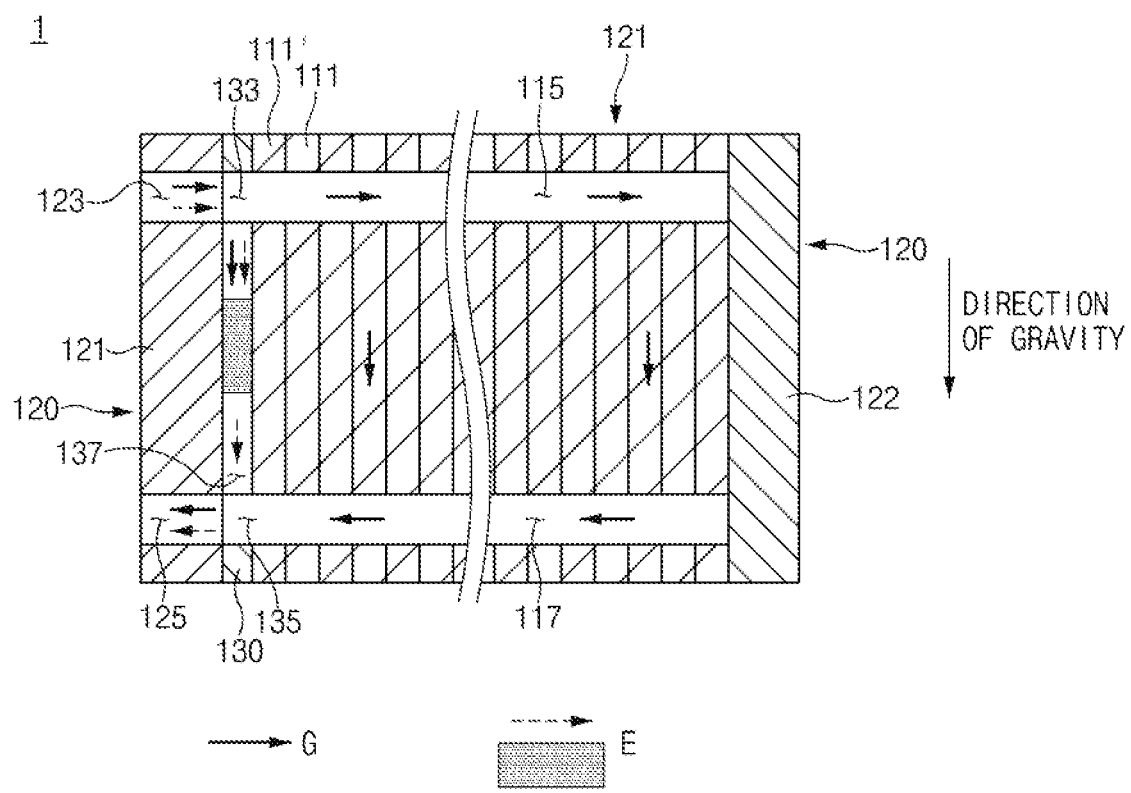
FIG. 1 illustrates a cross-sectional view of a fuel cell stack according to a first exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
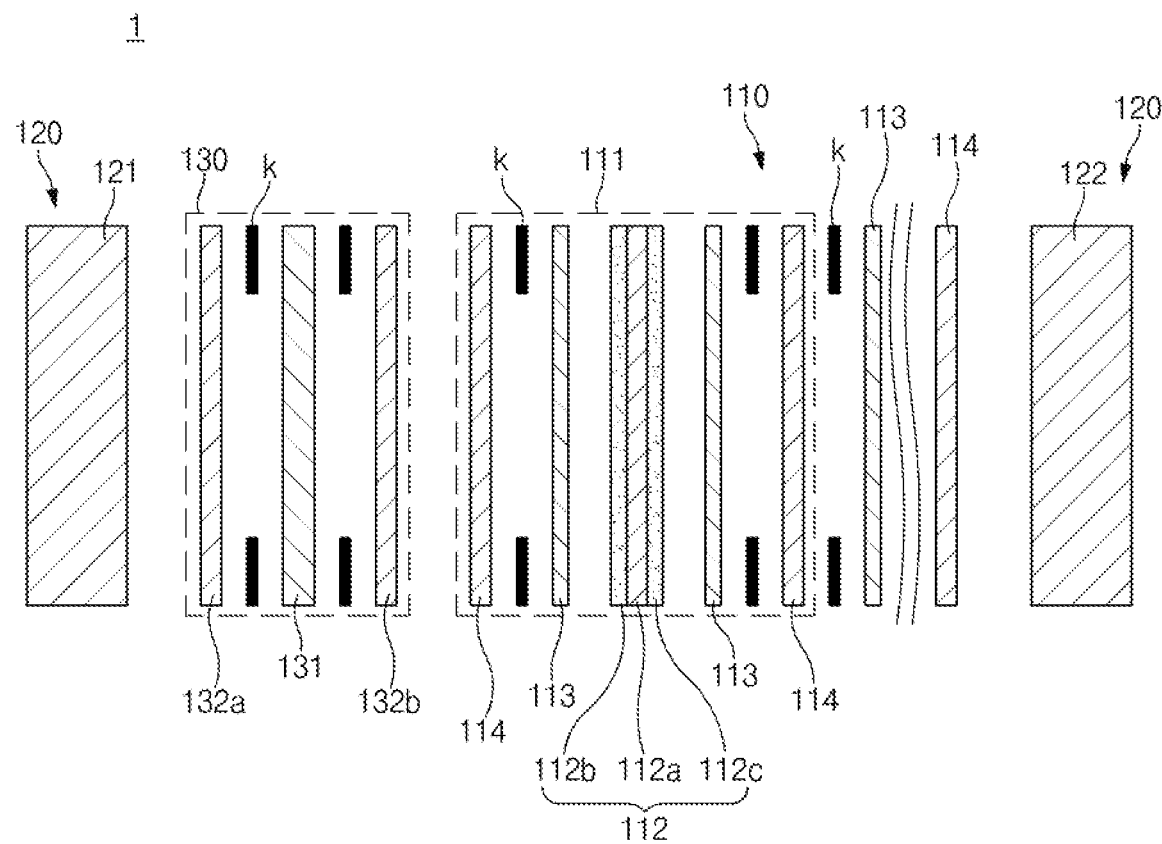
FIG. 2 illustrates a stacked structure of fuel cells and a dummy cell illustrated in FIG. 1.
Figure 3:
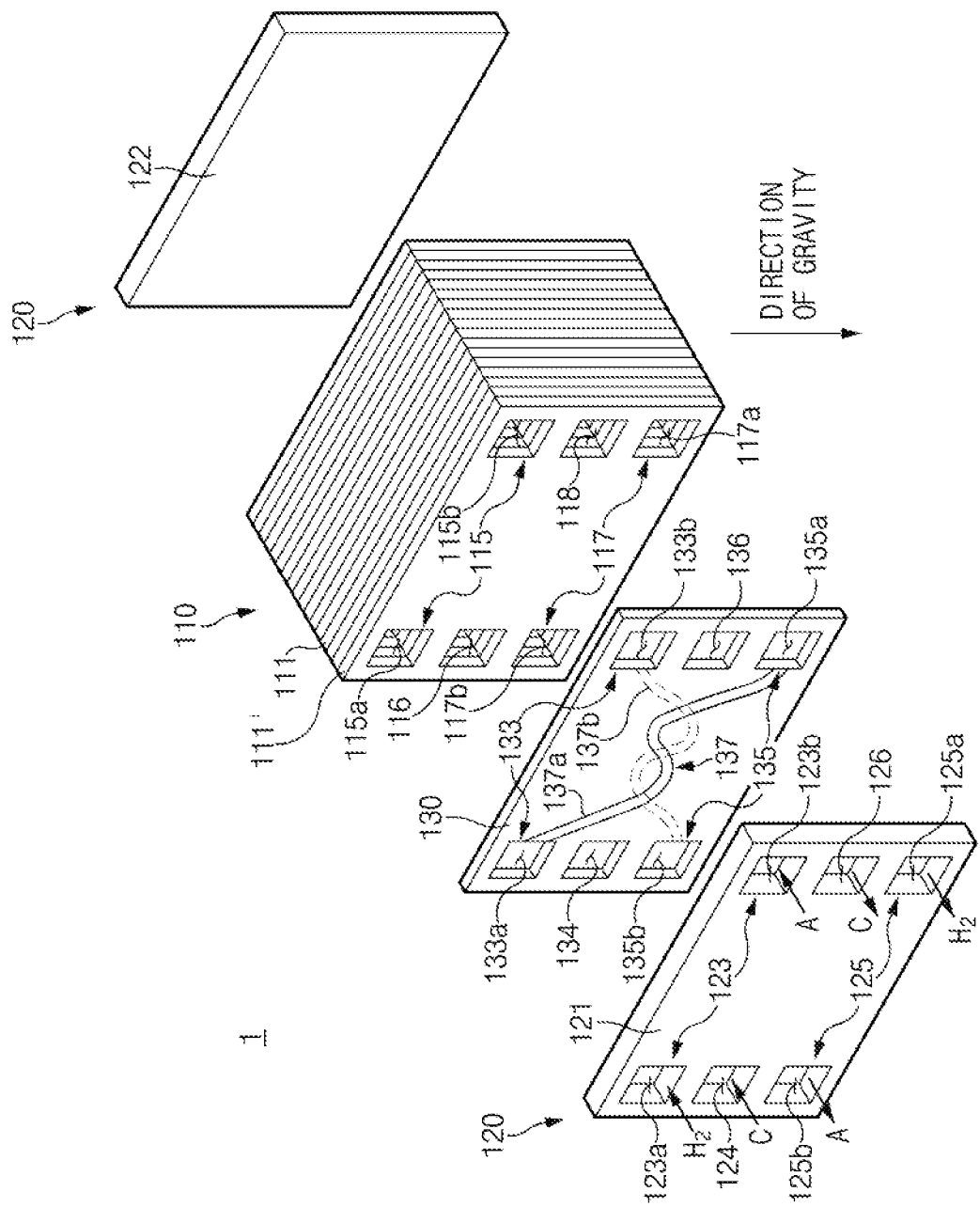
FIG. 3 illustrates an exploded perspective view of the fuel cell stack illustrated in FIG. 1.

FIG. 1 illustrates a cross-sectional view of a fuel cell stack according to a first exemplary embodiment of the present disclosure. FIG. 2 illustrates a stacked structure of fuel cells and a dummy cell illustrated in FIG. 1, and FIG. 3 illustrates an exploded perspective view of the fuel cell stack illustrated in FIG. 1.

Referring to FIG. 1, a fuel cell stack 1, according to the first exemplary embodiment of the present disclosure, includes a cell stacked body 110 in which a plurality of fuel cells 111 are stacked in multiple layers, an end plate 120 by which the fuel cells 111 are fastened, and a dummy cell 130 interposed between the cell stacked body 110 and the end plate 120 and having a bypass channel 137 that is formed to discharge condensed water E introduced into the fuel cell stack 1 to the outside of the fuel cell stack 1.

The cell stacked body 110 includes, as illustrated in FIG. 1, the plurality of fuel cells 111 that are stacked in multiple layers in a predetermined direction. As illustrated in FIG. 2, each of the fuel cells 111 includes a membrane electrode assembly 112, gas diffusion layers 113 attached to both external surfaces of the membrane electrode assembly 112, and bipolar plates 114 attached to external surfaces of the gas diffusion layers 113.

The membrane electrode assembly 112 includes a polymer electrolyte membrane 112a, an anode (fuel electrode) 112b attached to one surface of the polymer electrolyte membrane 112a, and a cathode (air electrode) 112c attached to the other surface of the polymer electrolyte membrane 112a.

Each of the gas diffusion layers 113 may be attached to any one of an external surface of the anode 112b and an external surface of the cathode 112c.

Each of the bipolar plates 114 may be attached to an external surface of any one of the gas diffusion layers 113. A gasket k for airtightness may be interposed between the bipolar plate 114 and the gas diffusion layer 113 that are adjacent to each other.

The bipolar plates 114 may be provided to circulate a reactant gas G and a coolant C delivered from an open end plate 121 to be described later to the fuel cells 111, respectively. To this end, as illustrated in FIG. 3, each of the bipolar plates 114 includes a gas supply manifold 115 supplying the reactant gas G supplied to the cell stacked body 110 to the electrodes of each fuel cell 111, a coolant supply manifold 116 supplying the coolant C supplied to the cell stacked body 110 to a coolant channel (not shown) of each fuel cell 111, a gas exhaust manifold 117 discharging the reactant gas G having passed through the electrodes of each fuel cell 111 from the cell stacked body 110, and a coolant exhaust manifold 118 discharging the coolant C having passed through the coolant channel from the cell stacked body 110.

In addition, as illustrated in FIG. 3, the gas supply manifold 115 includes a hydrogen supply manifold 115a supplying hydrogen ($H_2$) supplied to the cell stacked body 110 to the anode 112b of each fuel cell 111, and an air supply manifold 115b supplying air A supplied to the cell stacked body 110 to the cathode 112c of each fuel cell 111. Symmetrically, as illustrated in FIG. 3, the gas exhaust manifold 117 includes a hydrogen exhaust manifold 117a discharging the hydrogen ($H_2$) having passed through the anode 112b of each fuel cell 111 from the cell stacked body 110, and an air exhaust manifold 117b discharging the air A having passed through the cathode 112c of each fuel cell 111 from the cell stacked body 110.

In order to smoothly discharge the water produced during power generation from the fuel cells 111, the gas exhaust manifold 117 may be spaced apart from the gas supply manifold 115 by a predetermined distance in the direction of gravity.

For example, the hydrogen supply manifold 115a may be formed in an upper portion of one side of the bipolar plate 114, and the air supply manifold 115b may be formed in an upper portion of the other side of the bipolar plate 114.

For example, the hydrogen exhaust manifold 117a may be formed in a lower portion of the other side of the bipolar plate 114, and the air exhaust manifold 117b may be formed in a lower portion of one side of the bipolar plate 114.

For example, the coolant supply manifold 116 may be formed between the hydrogen supply manifold 115a and the air exhaust manifold 117b, and the coolant exhaust manifold 118 may be formed between the air supply manifold 115b and the hydrogen exhaust manifold 117a.

As illustrated in FIG. 3, the fuel cells 111 may be stacked in multiple layers in a predetermined direction such that the same kind of manifolds 115, 116, 117, and 118 communicate with each other. The reactant gas G and the coolant C supplied from the outside through inlets 123 and 124 of the open end plate 121 may circulate in the fuel cells 111 through the manifolds 115, 116, 117, and 118.

The end plate 120 may be used to fasten the fuel cells 111, and may be provided to supply the reactant gas G and the coolant C from the outside to the fuel cells 111 or discharge the reactant gas G and the coolant C having passed through the fuel cells 111 to the outside. To this end, the end plate 120 includes, as illustrated in FIG. 3, the open end plate 121 disposed at one end of the cell stacked body 110, and a closed end plate 122 disposed at the other end of the cell stacked body 110.

The open end plate 121 may be provided to supply the reactant gas G and the coolant C supplied from external supply sources to the fuel cells 111 or discharge the reactant gas G and the coolant C having passed through the fuel cells 111 to the outside. To this end, the open end plate 121 includes, as illustrated in FIG. 3, a gas inlet 123 through which the reactant gas G supplied from an external gas supply source is introduced, a gas outlet 125 through which the reactant gas G discharged from the cell stacked body 110 is discharged to the outside, a coolant inlet 124 through which the coolant C supplied from an external coolant supply source is introduced, and a coolant outlet 126 through which the coolant C discharged from the cell stacked body 110 is discharged to the outside.

In addition, the gas inlet 123 includes, as illustrated in FIG. 3, a hydrogen inlet 123a through which the hydrogen ($H_2$) supplied from an external hydrogen supply source is introduced, and an air inlet 123b through which the air A supplied from an external air supply source is introduced. Symmetrically, the gas outlet 125 includes, as illustrated in FIG. 3, a hydrogen outlet 125a through which the hydrogen ($H_2$) discharged from the cell stacked body 110 is discharged to the outside, and an air outlet 125b through which the air A discharged from the cell stacked body 110 is discharged to the outside.

The inlets 123 and 124 and the outlets 125 and 126 may be positioned to correspond to the manifolds 115, 116, 117, and 118 of the cell stacked body 110 so as to communicate with the manifolds 115, 116, 117, and 118 of the cell stacked body 110.

For example, the hydrogen inlet 123a may be formed in an upper portion of one side of the open end plate 121 to communicate with the hydrogen supply manifold 115a of the cell stacked body 110, and the air inlet 123b may be formed in an upper portion of the other side of the open end plate 121 to communicate with the air supply manifold 115b.

For example, the hydrogen outlet 125a may be formed in a lower portion of the other side of the open end plate 121 to communicate with the hydrogen exhaust manifold 117a, and the air outlet 125b may be formed in a lower portion of one side of the open end plate 121 to communicate with the air exhaust manifold 117b.

For example, the coolant inlet 124 may be formed between the hydrogen inlet 123a and the air outlet 125b to communicate with the coolant supply manifold 116, and the coolant outlet 126 may be formed between the air inlet 123b and the hydrogen outlet 125a to communicate with the coolant exhaust manifold 118.

The inlets 123 and 124 may be used to supply the reactant gas G and the coolant C supplied from the outside to the manifolds 115 and 116 of the cell stacked body 110, and the outlets 125 and 126 may be used to discharge the reactant gas G and the coolant C discharged from the manifolds 117 and 118 of the cell stacked body 110 to the outside.

As illustrated in FIG. 3, the closed end plate 122 may be provided to seal the manifolds 115, 116, 117, and 118 of the cell stacked body 110.

As illustrated in FIG. 3, the open end plate 121 may be disposed at one end of the cell stacked body 110 to allow the inlets 123 and 124 and the outlets 125 and 126 to communicate with the manifolds 115, 116, 117, and 118 of the cell stacked body 110, and the closed end plate 122 may be disposed at the other end of the cell stacked body 110 to close the manifolds 115, 116, 117, and 118 of the cell stacked body 110. In other words, the cell stacked body 110 may be interposed between the open end plate 121 and the closed end plate 122. The open end plate 121 and the closed end plate 122 may be fastened by a long bolt or another fastening member. Thus, the fuel cells 111 of the cell stacked body 110 may be fastened by the open end plate 121 and the closed end plate 122.

The dummy cell 130 includes, as illustrated in FIG. 2, a gas diffusion layer 131, a first bipolar plate 132a attached to one surface of the gas diffusion layer 131, and a second bipolar plate 132b attached to the other surface of the gas diffusion layer 131. The dummy cell 130 differs from the fuel cells 111 in that the former does not include the membrane electrode assembly 112 and cannot produce electricity. The dummy cell 130 may be interposed between an inlet-side fuel cell 111' located at the foremost end of the cell stacked body 110 among the fuel cells 111 of the cell stacked body 110 and the open end plate 121, as illustrated in FIG. 3.

Each of the first bipolar plate 132a and the second bipolar plate 132b may be provided to selectively discharge the condensed water E, which is introduced to the interior of the fuel cell stack 1 together with the reactant gas G, to the outside. In other words, each of the first bipolar plate 132a and the second bipolar plate 132b may be provided to allow only the reactant gas G to reach the fuel cells 111 and allow the condensed water E to be discharged to the outside by the dummy cell 130 without reaching the fuel cells 111. To this end, the dummy cell 130 includes, as illustrated in FIG. 3, a gas supply manifold 133 delivering the reactant gas G having passed through the gas inlet 123 of the open end plate 121 to the gas supply manifold 115 of the cell stacked body 110, a coolant supply manifold 134 delivering the coolant C having passed through the coolant inlet 124 of the open end plate 121 to the coolant supply manifold 116 of the cell stacked body 110, a gas exhaust manifold 135 delivering the reactant gas G discharged from the gas exhaust manifold 117 of the cell stacked body 110 to the gas outlet 125 of the open end plate 121, a coolant exhaust manifold 136 delivering the coolant C discharged from the coolant exhaust manifold 118 of the cell stacked body 110 to the coolant outlet 126 of the open end plate 121, and a bypass channel 137 connecting the gas supply manifold 133 to the gas exhaust manifold 135 to guide the condensed water E introduced into the gas supply manifold 133 to the gas exhaust manifold 135, and being partially curved to allow the condensed water E to be collected.

In addition, as illustrated in FIG. 3, the gas supply manifold 133 includes a hydrogen supply manifold 133a delivering the hydrogen ($H_2$) having passed through the gas inlet 123 of the open end plate 121 to the hydrogen supply manifold 115a of the cell stacked body 110, and an air supply manifold 133b delivering the air A having passed through the air inlet 123b of the open end plate 121 to the air supply manifold 115b of the cell stacked body 110, and the gas exhaust manifold 135 includes a hydrogen exhaust manifold 135a delivering the hydrogen ($H_2$) discharged from the hydrogen exhaust manifold 117a of the cell stacked body 110 to the hydrogen outlet 125a of the open end plate 121, and an air exhaust manifold 135b delivering the hydrogen ($H_2$) discharged from the air exhaust manifold 117b of the cell stacked body 110 to the air outlet 125b of the open end plate 121.

The manifolds 133, 134, 135, and 136 of the dummy cell 130 may be positioned to correspond to the manifolds 115, 116, 117, and 118 of the cell stacked body 110 so as to communicate with the inlets 123 and 124 and the outlets 125 and 126 of the open end plate 121 and the manifolds 115, 116, 117, and 118 of the cell stacked body 110, respectively.

For example, the hydrogen supply manifold 133a may be formed in an upper portion of one side of each of the first bipolar plate 132a and the second bipolar plate 132b to communicate with the hydrogen inlet 123a and the hydrogen supply manifold 115a, and the air supply manifold 133b may be formed in an upper portion of the other side of each of the first bipolar plate 132a and the second bipolar plate 132b to communicate with the air inlet 123b and the air supply manifold 115b.

For example, the hydrogen exhaust manifold 135a may be formed in a lower portion of the other side of each of the first bipolar plate 132a and the second bipolar plate 132b to communicate with the hydrogen outlet 125a and the hydrogen exhaust manifold 117a, and the air exhaust manifold 135b may be formed in a lower portion of one side of each of the first bipolar plate 132a and the second bipolar plate 132b to communicate with the air outlet 125b and the air exhaust manifold 117b.

For example, the coolant supply manifold 134 may be formed between the hydrogen supply manifold 133a and the air exhaust manifold 135b to communicate with the coolant inlet 124 and the coolant supply manifold 116, and the coolant exhaust manifold 136 may be formed between the air supply manifold 133b and the hydrogen exhaust manifold 135a to communicate with the coolant outlet 126 and the coolant exhaust manifold 118.

As described above, in order to smoothly discharge the water from the fuel cells 111, the gas exhaust manifold 117 of the cell stacked body 110 may be spaced apart from the gas supply manifold 115 by a predetermined distance in the direction of gravity. The gas exhaust manifold 135 of the dummy cell 130 may also be spaced apart from the gas supply manifold 133 by a predetermined distance in the direction of gravity. Hereinafter, the bypass channel 137 will be described on the premise that the gas supply manifold 133 and the gas exhaust manifold 135 are disposed in the aforementioned relative positions (to be high and low).

The condensed water E produced through the condensation of moisture contained in the reactant gas G may also flow into the gas inlet 123 of the open end plate 121. If the condensed water E is supplied to the fuel cells 111, the condensed water E may cause the degradation of the anode 112b and the cathode 112c to reduce the durability of the fuel cell system. In order to solve this problem, the dummy cell 130 includes the bypass channel 137 bypassing the condensed water E flowing into the interior of the fuel cell stack 1 to prevent the condensed water E from reaching the gas supply manifold 115 of the cell stacked body 110, thereby discharging the condensed water E to the outside of the fuel cell stack 1.

The bypass channel 137 may be provided to individually bypass the condensed water E, which is introduced into the interior of the fuel cell stack 1 together with hydrogen ($H_2$), and the condensed water E, which is introduced into the interior of the fuel cell stack 1 together with the air A. To this end, the bypass channel 137 includes, as illustrated in FIG. 3, a first bypass channel 137a formed in one surface of the dummy cell 130 to guide the condensed water E, which is introduced into the hydrogen supply manifold 133a together with hydrogen ($H_2$), to the hydrogen exhaust manifold 135a, and a second bypass channel 137b formed in the other surface of the dummy cell 130 to guide the condensed water E, which is introduced into the air supply manifold 133b together with the air A, to the air exhaust manifold 135b. As illustrated in FIG. 3, the first bypass channel 137a and the second bypass channel 137b may have a symmetrical shape to perform the same function. Therefore, the first bypass channel 137a will be described in detail and the second bypass channel 137b will be briefly described below for convenience of explanation.

Figure 4:
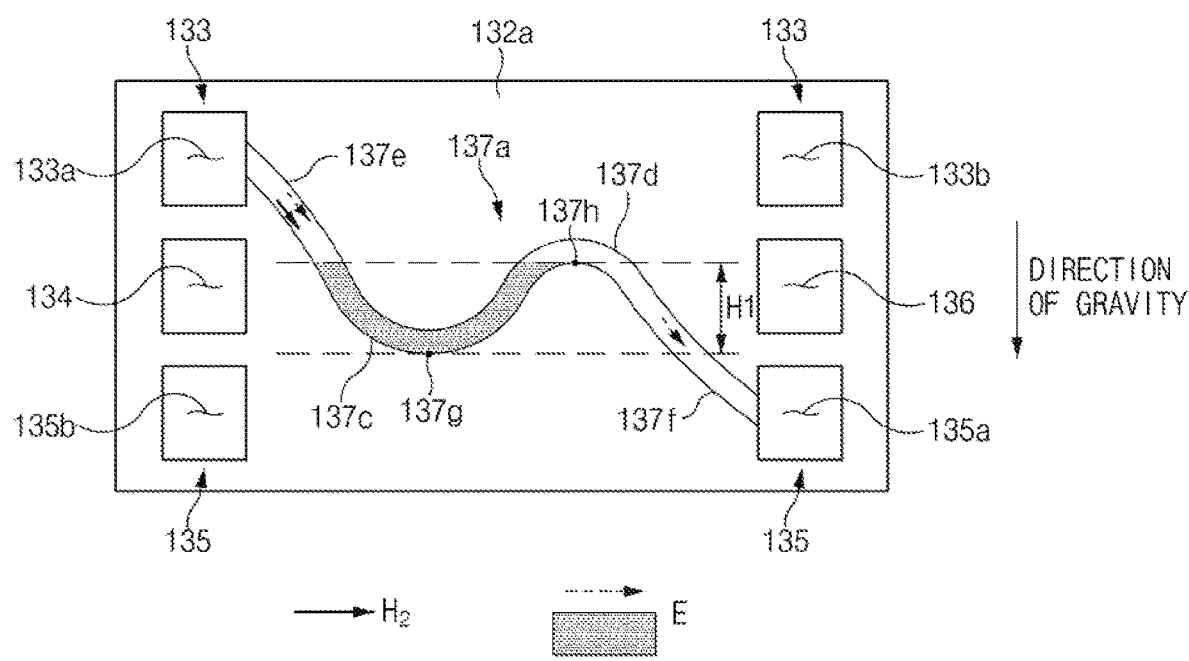
FIG. 4 illustrates a plan view of a first bipolar plate illustrated in FIG. 3.

FIG. 4 illustrates a plan view of the first bipolar plate illustrated in FIG. 3.

As illustrated in FIG. 4, the first bypass channel 137a may be recessed in one surface of the first bipolar plate 132a to connect the hydrogen supply manifold 133a to the hydrogen exhaust manifold 135a. One surface of the first bipolar plate 132a may be one of two surfaces of the first bipolar plate 132a in contact with the open end plate 121. Thus, the open end plate 121 may close an opening portion of the first bypass channel 137a to maintain airtightness of the first bypass channel 137a.

At least a portion of the first bypass channel 137a may be curved to allow at least a portion of the condensed water E flowing from the hydrogen supply manifold 133a to the first bypass channel 137a to be collected in the interior of the first bypass channel 137a. For example, as illustrated in FIG. 4, the first bypass channel 137a includes a valley portion 137c curved to allow the condensed water E to be collected, a ridge portion 137d curved between the valley portion 137c and the hydrogen exhaust manifold 135a to form a predetermined height difference H1 with respect to the valley portion 137c, an inflow channel 137e formed between the hydrogen supply manifold 133a and the valley portion 137c to guide the condensed water E introduced into the hydrogen supply manifold 133a to the valley portion 137c, and an outflow channel 137f formed between the ridge portion 137d and the hydrogen exhaust manifold 135a to guide the condensed water E having passed through the ridge portion 137d to the hydrogen exhaust manifold 135a.

The valley portion 137c may be concavely curved in the direction of gravity. Symmetrically, the ridge portion 137d may be convexly curved in the opposite direction of gravity. A front end of the ridge portion 137d may be connected to a rear end of the valley portion 137c. The valley portion 137c and the ridge portion 137d may have the predetermined height difference H1 such that an inflection point 137h of the ridge portion 137d may be spaced apart from an inflection point 137g of the valley portion 137c in the opposite direction of gravity.

The inflow channel 137e may be downwardly inclined in the direction of gravity between the hydrogen supply manifold 133a and a front end of the valley portion 137c, and connect the hydrogen supply manifold 133a to the front end of the valley portion 137c. The outflow channel 137f may be downwardly inclined in the direction of gravity between a rear end of the ridge portion 137d and the hydrogen exhaust manifold 135a, and connect the rear end of the ridge portion 137d to the hydrogen exhaust manifold 135a.

Hereinafter, referring to FIG. 4, a process of discharging the condensed water E, which is introduced into the interior of the fuel cell stack 1 together with hydrogen ($H_2$), to the outside of the fuel cell stack 1 through the first bypass channel 137a will be described.

First of all, the condensed water E having passed through the hydrogen inlet 123a may reach the hydrogen supply manifold 133a together with hydrogen ($H_2$).

Next, the condensed water E having reached the hydrogen supply manifold 133a may flow into the inflow channel 137e by gravity. In addition, a portion of hydrogen ($H_2$) having reached the hydrogen supply manifold 133a may also flow into the inflow channel 137e.

Thereafter, the condensed water E and the hydrogen ($H_2$) introduced into the inflow channel 137e may flow through the inflow channel 137e to reach the valley portion 137c. Since the valley portion 137c is concavely curved in the direction of gravity, the condensed water E having reached the valley portion 137c may be collected in the valley portion 137c. As an amount of the condensed water E collected in the valley portion 137c increases, the condensed water E may rise in the valley portion 137c, a portion of the ridge portion 137d, and a portion of the inflow channel 137e (hereinafter referred to as "the valley portion 137c and the adjacent portions"), as illustrated in FIG. 4. Here, the portion of the ridge portion 137d refers to a portion between the front end of the ridge portion 137d and the inflection point 137h of the ridge portion 137d. As the increased amount of condensed water E is collected in the valley portion 137c and the adjacent portions, at least a portion of the valley portion 137c and the adjacent portions may be closed by the condensed water E. Thus, hydrogen ($H_2$) may pass through the valley portion 137c and the ridge portion 137d to flow into the hydrogen exhaust manifold 135a before the valley portion 137c and the adjacent portions are closed by the condensed water E, but the flow of hydrogen ($H_2$) may be blocked by the condensed water E after the valley portion 137c and the adjacent portions are closed by the condensed water E, resulting in a failure in the flow of hydrogen ($H_2$) into the hydrogen exhaust manifold 135a.

Then, the condensed water E collected in the valley portion 137c may flow into the hydrogen exhaust manifold 135a through the outflow channel 137f after passing through the inflection point 137h of the ridge portion 137d when a discharge force thereof is greater than a retention force. The condensed water E introduced into the hydrogen exhaust manifold 135a through the first bypass channel 137a may be discharged to the outside of the fuel cell stack 1, together with the hydrogen discharged from the hydrogen exhaust manifold 117a of the cell stacked body 110. Thus, the first bypass channel 137a may prevent the degradation of the anode 112b that may be caused by the condensed water E, thereby improving the durability of the fuel cell system. In addition, the first bypass channel 137a may prevent the hydrogen ($H_2$) from being discharged to the outside without reaching the fuel cells 111, thereby improving the efficiency of the fuel cell system.

Meanwhile, the discharge force refers to a driving force that acts on the condensed water E to allow the condensed water E to flow from the hydrogen supply manifold 133a to the hydrogen exhaust manifold 135a. The discharge force includes a weight of the condensed water E collected between the inflection point 137g of the valley portion 137c and a front end of the inflow channel 137e, and a differential pressure between the hydrogen supply manifold 133a and the hydrogen exhaust manifold 135a. In addition, the retention force refers to a resistance force that acts on the condensed water E to prevent the condensed water E from flowing from the hydrogen supply manifold 133a to the hydrogen exhaust manifold 135a. The retention force includes a fractional force acting between the condensed water E collected in the valley portion 137c and the adjacent portions and internal surfaces of the valley portion 137c and the adjacent portions, and a weight of the condensed water E collected between the inflection point 137g of the valley portion 137c and the inflection point 137h of the ridge portion 137d. Thus, by adjusting the height difference H1 between the valley portion 137c and the ridge portion 137d, the differential pressure between the hydrogen supply manifold 133a and the hydrogen exhaust manifold 135a, a sectional area of the first bypass channel 137a, and the like, the amount of the condensed water E collected in the first bypass channel 137a may be adjusted to an appropriate level.

Figure 5:
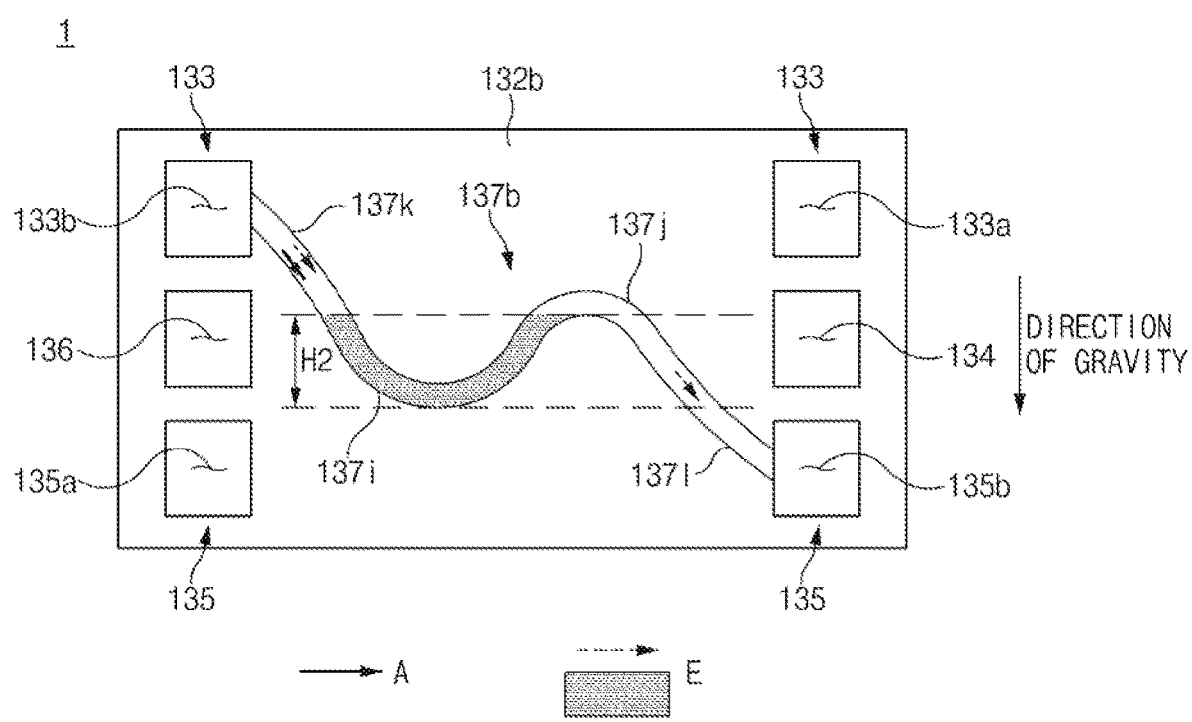
FIG. 5 illustrates a plan view of a second bipolar plate illustrated in FIG. 3.

FIG. 5 illustrates a plan view of the second bipolar plate illustrated in FIG. 3.

As illustrated in FIG. 5, the second bypass channel 137b may be recessed in one surface of the second bipolar plate 132b to connect the air supply manifold 133b to the air exhaust manifold 135b. Here, one surface of the second bipolar plate 132b may be one of two surfaces of the second bipolar plate 132b in contact with the bipolar plate 114 of the inlet-side fuel cell 111'. Thus, an opening portion of the second bypass channel 137b may be closed by the bipolar plate 114 of the inlet-side fuel cell 111' to maintain airtightness of the second bypass channel 137b.

At least a portion of the second bypass channel 137b may be curved to allow at least a portion of the condensed water E flowing from the air supply manifold 133b to the second bypass channel 137b to be collected in the interior of the second bypass channel 137b. For example, as illustrated in FIG. 5, the second bypass channel 137b includes a valley portion 137i curved to allow the condensed water E to be collected, a ridge portion 137j curved between the valley portion 137i and the air exhaust manifold 135b to form a predetermined height difference H2 with respect to the valley portion 137i, an inflow channel 137k formed between the air supply manifold 133b and the valley portion 137i to guide the condensed water E introduced into the air supply manifold 133b to the valley portion 137i, and an outflow channel 137l formed between the ridge portion 137j and the air exhaust manifold 135b to guide the condensed water E having passed through the ridge portion 137j to the air exhaust manifold 135b.

The configuration of the second bypass channel 137b may be the same as that of the first bypass channel 137a described above. Thus, due to the configuration of the second bypass channel 137b, the condensed water E may be collected in the valley portion 137i, a portion of the inflow channel 137k, and a portion of the ridge portion 137j and be then gradually guided to the air exhaust manifold 135b depending on strengths of the discharge force and the retention force of the condensed water E, and as the valley portion 137i and the adjacent portions are closed by the condensed water E, the air A may fail to pass through the second bypass channel 137b, and may be delivered to the air supply manifold 133b of the cell stacked body 110. Therefore, the second bypass channel 137b may prevent the degradation of the cathode 112c that may be caused by the condensed water E, thereby improving the durability of the fuel cell system. In addition, the second bypass channel 137b may prevent the air A from being discharged to the outside without reaching the fuel cells 111, thereby improving the efficiency of the fuel cell system.

Figure 6:
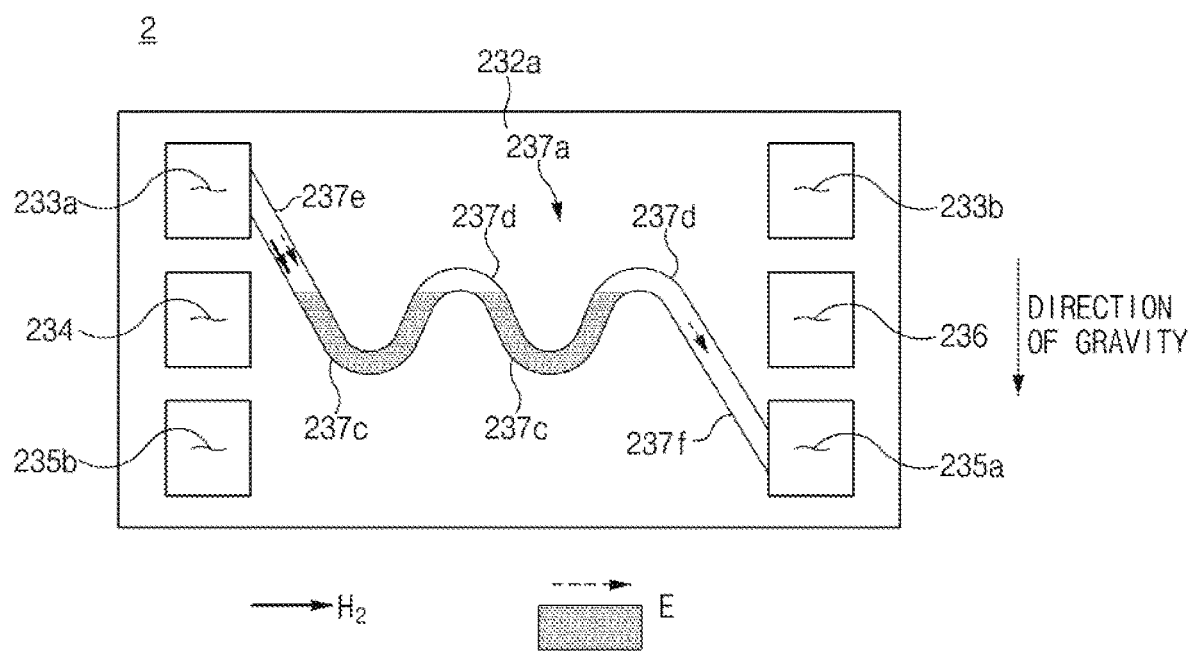
FIG. 6 illustrates a plan view of a first bipolar plate of a fuel cell stack according to a second exemplary embodiment of the present disclosure.

FIG. 6 illustrates a plan view of a first bipolar plate of a fuel cell stack, according to a second exemplary embodiment of the present disclosure.

A fuel cell stack 2 according to the second exemplary embodiment of the present disclosure has the same configuration as that of the above-described fuel cell stack 1, except that a structure of a bypass channel is changed. Hereinafter, the bypass channel of the fuel cell stack 2 will be described by explaining a first bypass channel 237a as an example.

The first bypass channel 237a may be recessed in one surface of a first bipolar plate 232a in contact with the open end plate 121. The first bypass channel 237a differs from the first bypass channel 137a of the fuel cell stack 1 in that the former includes a plurality of valley portions 237c and a plurality of ridge portions 237d.

As illustrated in FIG. 6, the ridge portion 237d may be positioned between a pair of adjacent valley portions 237c or between a last valley portion 237c and a hydrogen exhaust manifold 235a. Thus, the condensed water E introduced into the first bypass channel 237a may be collected in the valley portions 237c, a portion of the inflow channel 237e, and portions of the ridge portions 237d, due to a height difference between the valley portions 237c and the ridge portions 237d.

Since the first bypass channel 237a includes the plurality of valley portions 237c and the plurality of ridge portions 237d, it may adjust an amount of the condensed water E collected in the first bypass channel 237a to a more appropriate level, compared to the first bypass channel 137a of the fuel cell stack 1.

Meanwhile, non-described reference numerals 233a, 233b, 234, 235b, 236, and 237f denote a hydrogen supply manifold, an air supply manifold, a coolant supply manifold, an air exhaust manifold, a coolant exhaust manifold, and an outflow channel, respectively.

Figure 7:
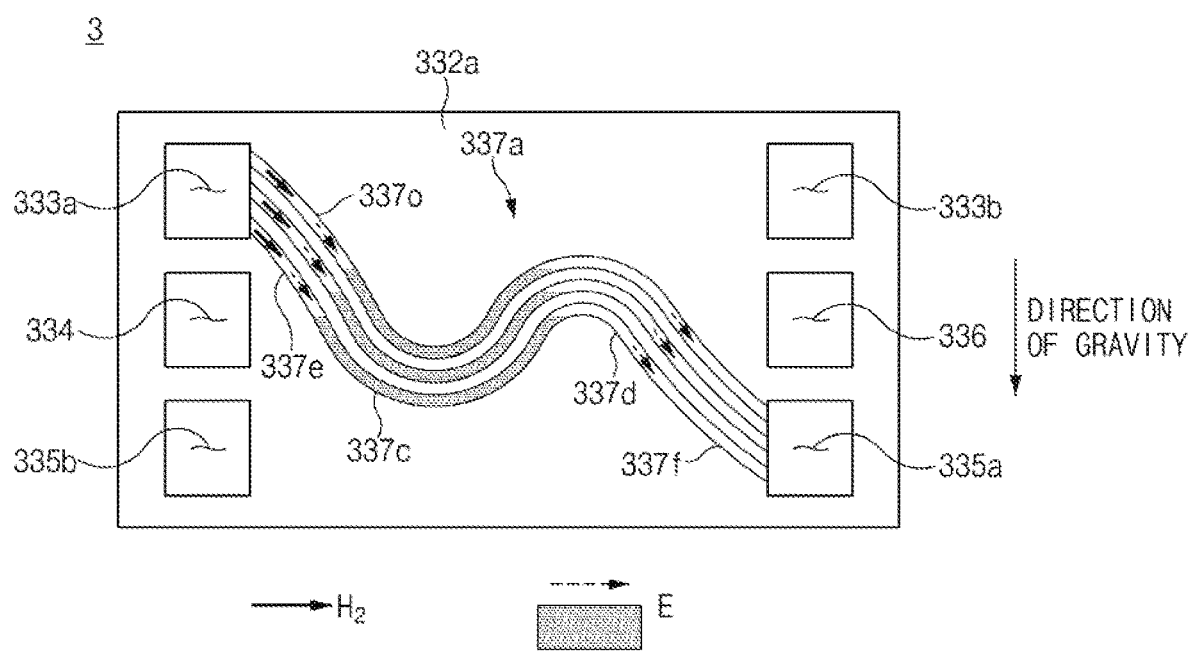
FIG. 7 illustrates a plan view of a first bipolar plate of a fuel cell stack according to a third exemplary embodiment of the present disclosure.

FIG. 7 illustrates a plan view of a first bipolar plate of a fuel cell stack, according to a third exemplary embodiment of the present disclosure.

A fuel cell stack 3 according to the third exemplary embodiment of the present disclosure has the same configuration as that of the above-described fuel cell stack 1, except that a structure of a bypass channel is changed. Hereinafter, the bypass channel of the fuel cell stack 3 will be described by explaining a first bypass channel 337a as an example.

The first bypass channel 337a may be recessed in one surface of a first bipolar plate 332a in contact with the open end plate 121. The first bypass channel 337a differs from the first bypass channel 137a of the fuel cell stack 1 in that the former includes a plurality of first unit bypass channels 337o parallel to each other.

The sectional area and hydraulic diameter of each of the first unit bypass channels 337o may be less than the sectional area and hydraulic diameter of the first bypass channel 137a of the fuel cell stack 1, but the sum of the sectional areas of all the first unit bypass channels 337o may be greater than the sectional area of the first bypass channel 137a. The first unit bypass channels 337o may be formed in the first bipolar plate 332a when it is difficult to form a single first bypass channel 337a having a large sectional area in the first bipolar plate 332a due to processing difficulties, but is not limited thereto. The first unit bypass channels 337o may increase a contact area between the condensed water E collected in the interior of the first bypass channel 337a and the internal surface of the first bypass channel 337a. Thus, the fuel cell stack 3 may increase a frictional force acting between the condensed water E collected in the interior of the first bypass channel 337a and the internal surface of the first bypass channel 337a, thereby increasing the retention force of the condensed water.

Meanwhile, non-described reference numerals 333a, 333b, 334, 335a, 335b, 336, 337c, 337d, 337e, and 337f denote a hydrogen supply manifold, an air supply manifold, a coolant supply manifold, a hydrogen exhaust manifold, an air exhaust manifold, a coolant exhaust manifold, a valley portion, a ridge portion, an inflow channel, and an outflow channel, respectively.

Figure 8:
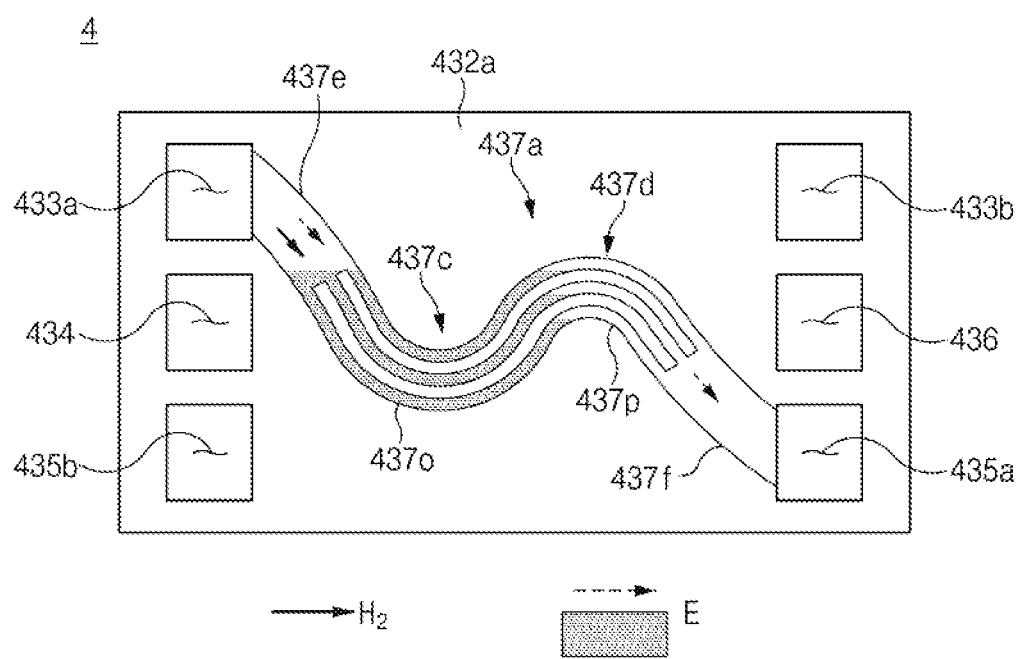
FIG. 8 illustrates a plan view of a first bipolar plate of a fuel cell stack according to a fourth exemplary embodiment of the present disclosure.

FIG. 8 illustrates a plan view of a first bipolar plate of a fuel cell stack according to a fourth exemplary embodiment of the present disclosure.

A fuel cell stack 4 according to the fourth exemplary embodiment of the present disclosure has the same configuration as that of the above-described fuel cell stack 1, except that a structure of a bypass channel is changed. Hereinafter, the bypass channel of the fuel cell stack 4 will be described by explaining a first bypass channel 437a as an example.

The first bypass channel 437a may be recessed in one surface of a first bipolar plate 432a in contact with the open end plate 121. The first bypass channel 437a differs from the first bypass channel 137a of the fuel cell stack 1 with respect to the structure of a valley portion 437c and a ridge portion 437d.

The valley portion 437c includes a plurality of unit valley portions 437o parallel to each other. A front end of each of the unit valley portions 437o may be connected to an inflow channel 437e. The ridge portion 437d includes a plurality of unit ridge portions 437p parallel to each other. A front end of each of the unit ridge portions 437p may be connected to a rear end of each of the unit valley portions 437o, and a rear end of each of the unit ridge portions 437p may be connected to an outflow channel 437f.

The sectional area and hydraulic diameter of each of the unit valley portions 437o may be less than the sectional area and hydraulic diameter of the inflow channel 437e, but the sum of the sectional areas of all the unit valley portions 437o may be greater than the sectional area of the inflow channel 437e. In addition, the unit ridge portions 437p may have the same sectional area and hydraulic diameter as those of the unit valley portions 437o. When the entire area of the first bypass channel 337a in the above-described fuel cell stack 3 is divided into the plurality of first unit bypass channels 337o, the retention force of the condensed water E may be excessively increased, and thus an amount of the condensed water E collected in the first bypass channel 337a may exceed an appropriate level. However, the fuel cell stack 4 has a structure in which only the valley portion 437c and the ridge portion 437d, in which the condensed water E is mainly collected, are limitedly divided into the plurality of unit valley portions 437o and the plurality of unit ridge portions 437p, and thus the retention force of the condensed water E may be increased to an appropriate level and an amount of the condensed water E collected in the first bypass channel may be adjusted to an appropriate level.

Meanwhile, non-described reference numerals 433a, 433b, 434, 435a, 435b, 436 denote a hydrogen supply manifold, an air supply manifold, a coolant supply manifold, a hydrogen exhaust manifold, an air exhaust manifold, and a coolant exhaust manifold, respectively.

Figure 9:
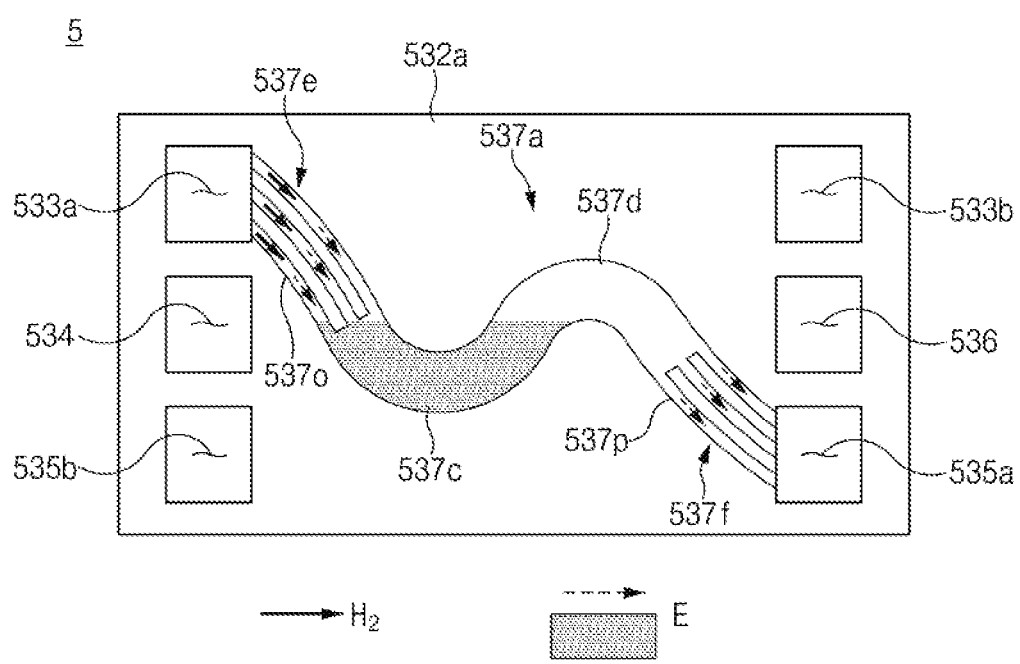
FIG. 9 illustrates a plan view of a first bipolar plate of a fuel cell stack according to a fifth exemplary embodiment of the present disclosure.

FIG. 9 illustrates a plan view of a first bipolar plate of a fuel cell stack according to a fifth exemplary embodiment of the present disclosure.

A fuel cell stack 5 according to the fifth exemplary embodiment of the present disclosure has the same configuration as that of the above-described fuel cell stack 1, except that a structure of a bypass channel is changed. Hereinafter, the bypass channel of the fuel cell stack 5 will be described by explaining a first bypass channel 537a as an example.

The first bypass channel 537a may be recessed in one surface of a first bipolar plate 532a in contact with the open end plate 121. The first bypass channel 537a differs from the first bypass channel 137a of the fuel cell stack 1 with respect to the structure of an inflow channel 537e and an outflow channel 537f.

The inflow channel 537e includes a plurality of unit inflow channels 537o parallel to each other. A front end of each of the unit inflow channels 537o may be connected to a hydrogen supply manifold 533a, and a rear end of each of the unit inflow channels 537o may be connected to a front end of a valley portion 537c. The outflow channel 537f includes a plurality of unit outflow channels 537p parallel to each other. A front end of each of the unit outflow channels 537p may be connected to a rear end of a ridge portion 537d, and a rear end of each of the unit outflow channels 537p may be connected to a hydrogen exhaust manifold 535a.

The sectional area and hydraulic diameter of each of the unit inflow channels 537o may be less than the sectional area and hydraulic diameter of the valley portion 537c, but the sum of the sectional areas of all the unit inflow channels 537o may be greater than the sectional area of the valley portion 537c. Thus, a force of hydrogen ($H_2$) flowing into the inflow channel 537e to push the condensed water E collected in the valley portion 537c may be increased in proportion to an increase in the sectional area of the inflow channel 537e. Therefore, the unit inflow channels 537o may increase the discharge force of the condensed water E.

The sectional area and hydraulic diameter of each of the unit outflow channels 537p may be less than the sectional area and hydraulic diameter of the valley portion 537c, but the sum of the sectional areas of all the unit outflow channels 537p may be greater than the sectional area of the valley portion 537c. Thus, the flow resistance of hydrogen ($H_2$) passing through the outflow channel 537f may be reduced in proportion to an increase in the sectional area of the outflow channel 537*f*. Therefore, the unit outflow channels 537*p* may reduce the retention force of the condensed water E.

Meanwhile, non-described reference numerals 533*b*, 534, 535*b*, and 536 denote an air supply manifold, a coolant supply manifold, an air exhaust manifold, and a coolant exhaust manifold, respectively.

Figure 10:
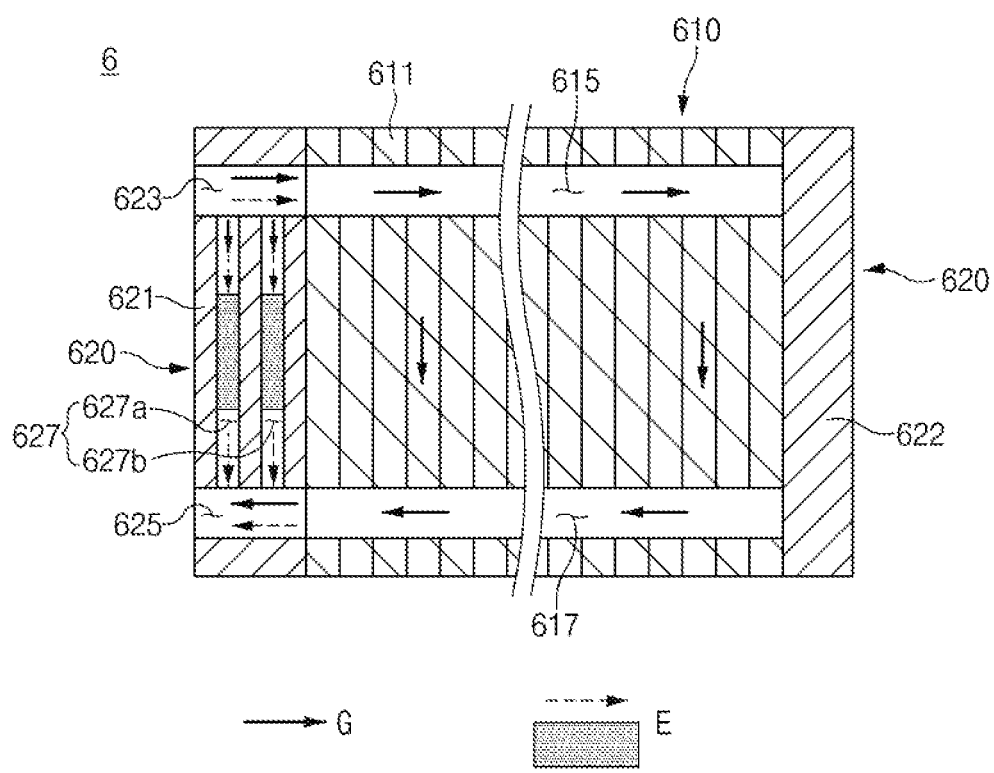
FIG. 10 illustrates a cross-sectional view of a fuel cell stack according to a sixth exemplary embodiment of the present disclosure.
Figure 11:
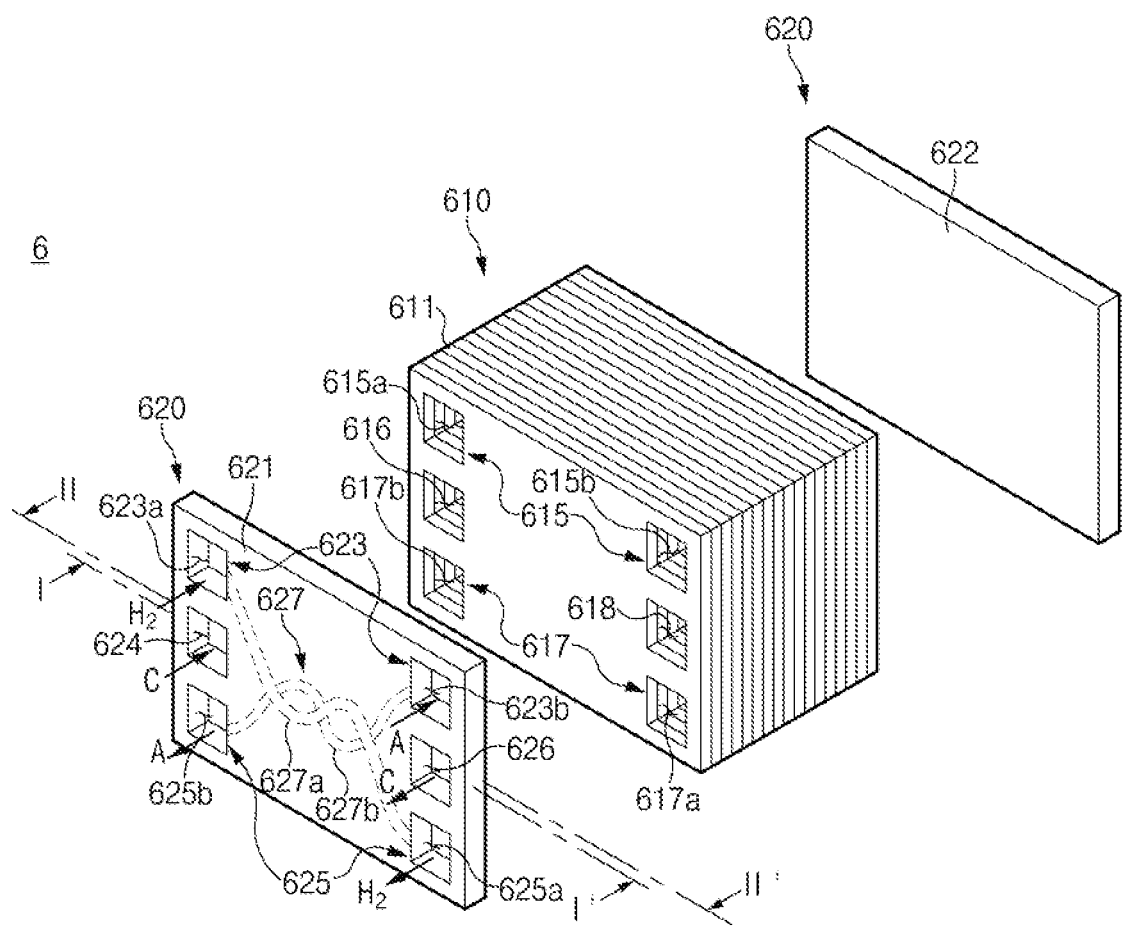
FIG. 11 illustrates an exploded perspective view of the fuel cell stack illustrated in FIG. 10.

FIG. 10 illustrates a cross-sectional view of a fuel cell stack according to a sixth exemplary embodiment of the present disclosure, and FIG. 11 illustrates an exploded perspective view of the fuel cell stack illustrated in FIG. 10.

A fuel cell stack 6 according to a sixth exemplary embodiment of the present disclosure has the same configuration as that of the above-described fuel cell stack 1, except that the dummy cell 30 is removed, and a bypass channel 627 is formed in an open end plate 621. Hereinafter, the fuel cell stack 6 will be described by focusing on the open end plate 621.

As illustrated in FIG. 10, the open end plate 621 may be provided to supply a reactant gas G and a coolant C supplied from external supply sources to fuel cells 611 or discharge the reactant gas G and the coolant C having passed through the fuel cells 611 to the outside. In addition, as illustrated in FIG. 10, the open end plate 621 may be provided to selectively discharge condensed water E, which is introduced to the interior of the fuel cell stack 6 together with the reactant gas G, to the outside. To this end, the open end plate 621 includes, as illustrated in FIG. 11, a gas inlet 623, a gas outlet 625, a coolant inlet 624, a coolant outlet 626, and a bypass channel 627.

In addition, the gas inlet 623 includes, as illustrated in FIG. 11, a hydrogen inlet 623*a* and an air inlet 623*b*. Symmetrically, the gas outlet 625 includes, as illustrated in FIG. 11, a hydrogen outlet 625*a* and an air outlet 625*b*.

The inlets 623 and 624 and the outlets 625 and 626 may be positioned to correspond to manifolds 615, 616, 617, and 618 of a cell stacked body 610 so as to communicate with the manifolds 615, 616, 617, and 618 of the cell stacked body 610.

For example, the hydrogen inlet 623*a* may be formed in an upper portion of one side of the open end plate 621 to communicate with a hydrogen supply manifold 615*a* of the cell stacked body 610, and the air inlet 623*b* may be formed in an upper portion of the other side of the open end plate 621 to communicate with an air supply manifold 615*b* of the cell stacked body 610.

For example, the hydrogen outlet 625*a* may be formed in a lower portion of the other side of the open end plate 621 to communicate with a hydrogen exhaust manifold 617*a* of the cell stacked body 610, and the air outlet 625*b* may be formed in a lower portion of one side of the open end plate 621 to communicate with an air exhaust manifold 617*b* of the cell stacked body 610.

For example, the coolant inlet 624 may be formed between the hydrogen inlet 623*a* and the air outlet 625*b* to communicate with a coolant supply manifold 616 of the cell stacked body 610, and the coolant outlet 626 may be formed between the air inlet 623*b* and the hydrogen outlet 625*a* to communicate with a coolant exhaust manifold 618 of the cell stacked body 610.

The bypass channel 627 may connect the gas inlet 623 to the gas outlet 625 to guide the condensed water E introduced to the gas inlet 623 to the gas outlet 625, and may be partially curved to allow the condensed water E to be collected. The bypass channel 627 may be provided to individually bypass the condensed water E, which is introduced into the interior of the fuel cell stack 6 together with hydrogen (H$_2$), and the condensed water E, which is introduced into the interior of the fuel cell stack 6 together with the air A. To this end, the bypass channel 627 includes, as illustrated in FIG. 11, a first bypass channel 627*a* formed in the interior of the open end plate 621 to guide the condensed water E, which is introduced into the hydrogen inlet 623*a* together with the hydrogen (H$_2$), to the hydrogen outlet 625*a*, and a second bypass channel 627*b* formed in the interior of the open end plate 621 to guide the condensed water E, which is introduced into the air inlet 623*b* together with the air A, to the air outlet 625*b*. As illustrated in FIG. 10, the first bypass channel 627*a* and the second bypass channel 627*b* may be formed in the interior of the open end plate 621 to be spaced apart from each other by a predetermined distance.

Figure 12:
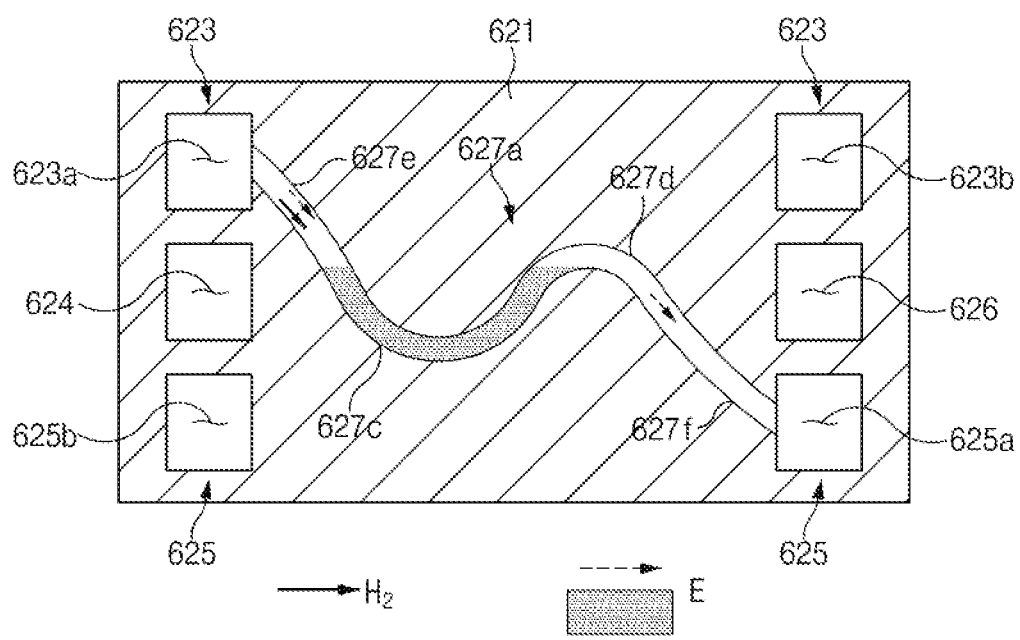
FIG. 12 illustrates a cross-sectional view of an open end plate illustrated in FIG. 11, taken along line I-I'.

FIG. 12 illustrates a cross-sectional view of an open end plate illustrated in FIG. 11, taken along line I-I'.

At least a portion of the first bypass channel 627*a* may be curved to allow at least a portion of the condensed water E flowing from the hydrogen inlet 623*a* to the first bypass channel 627*a* to be collected in the interior of the first bypass channel 627*a*. For example, as illustrated in FIG. 12, the first bypass channel 627*a* includes a valley portion 627*c* curved to allow the condensed water E to be collected, a ridge portion 627*d* curved between the valley portion 627*c* and the hydrogen outlet 625*a* to form a predetermined height difference with respect to the valley portion 627*c*, an inflow channel 627*e* formed between the hydrogen inlet 623*a* and the valley portion 627*c* to guide the condensed water E introduced into the hydrogen inlet 623*a* to the valley portion 627*c*, and an outflow channel 627*f* formed between the ridge portion 627*d* and the hydrogen outlet 625*a* to guide the condensed water E having passed through the ridge portion 627*d* to the hydrogen outlet 625*a*.

Due to the configuration of the first bypass channel 627*a*, the condensed water E introduced from the hydrogen inlet 623*a* may be collected in the valley portion 627*c*, a portion of the inflow channel 627*e*, and a portion of the ridge portion 627*d*, be then gradually guided to the hydrogen outlet 625*a* depending on strengths of the discharge force and the retention force of the condensed water E, and be discharged to the outside. On the other hand, as the valley portion 627*c* and the adjacent portions are closed by the condensed water E, the entire amount of hydrogen (H$_2$) may fail to pass through the first bypass channel 627*a*, and may be delivered to the hydrogen supply manifold 615*a* of the cell stacked body 610. Thus, the first bypass channel 627*a* may prevent the degradation of anodes of the fuel cells 611 that may be caused by the condensed water E, thereby improving the durability of the fuel cell system. In addition, the first bypass channel 627*a* may prevent the hydrogen (H$_2$) from being discharged to the outside without reaching the fuel cells 611, thereby improving the efficiency of the fuel cell system.

Figure 13:
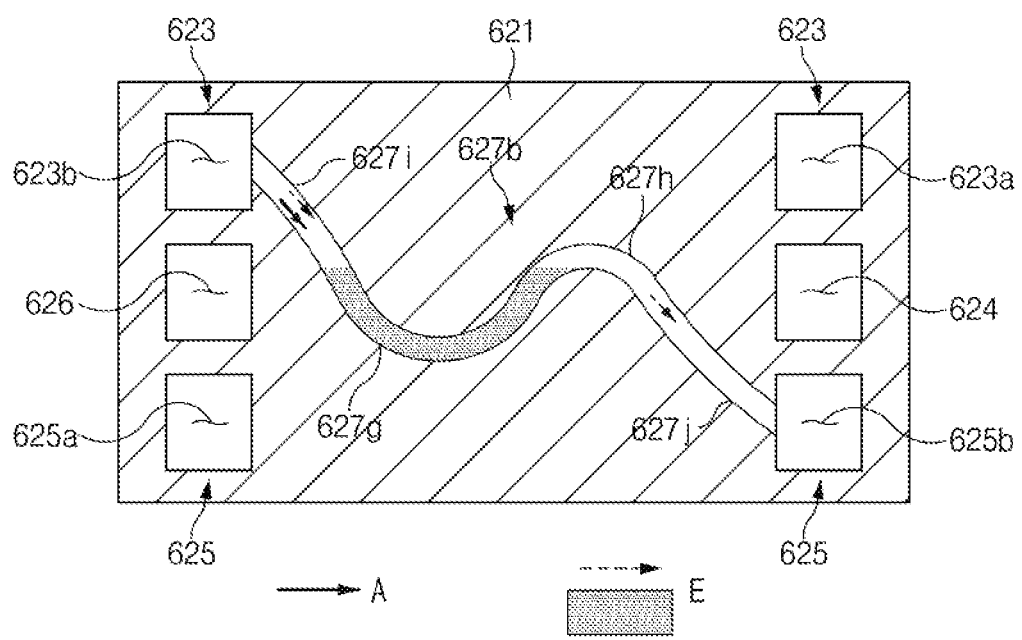
FIG. 13 illustrates a cross-sectional view of an open end plate illustrated in FIG. 11, taken along line II-II'.

FIG. 13 illustrates a cross-sectional view of an open end plate illustrated in FIG. 11, taken along line II-II'.

At least a portion of the second bypass channel 627*b* may be curved to allow at least a portion of the condensed water E flowing from the air inlet 623*b* to the second bypass channel 627*b* to be collected in the interior of the second bypass channel 627*b*. For example, as illustrated in FIG. 13, the second bypass channel 627*b* includes a valley portion 627*g* curved to allow the condensed water E to be collected, a ridge portion 627*h* curved between the valley portion 627*g* and the air outlet 625*b* to form a predetermined height difference with respect to the valley portion 627*g*, an inflow channel 627*i* formed between the air inlet 623*b* and the valley portion 627*g* to guide the condensed water E introduced into the air inlet 623*b* to the valley portion 627*g*, and an outflow channel 627j formed between the ridge portion 627h and the air outlet 625b to guide the condensed water E having passed through the ridge portion 627h to the air outlet 625b.

Due to the configuration of the second bypass channel 627b, the condensed water E introduced from the air inlet 623b may be collected in the valley portion 627g, a portion of the inflow channel 627j, and a portion of the ridge portion 627h, be then gradually guided to the air outlet 625b depending on strengths of the discharge force and the retention force of the condensed water E, and be discharged to the outside. On the other hand, as the valley portion 627i and the adjacent portions are closed by the condensed water E, the air A may fail to pass through the second bypass channel 627b, and may be delivered to the air supply manifold 615b of the cell stacked body 610. Thus, the second bypass channel 627b may prevent the degradation of cathodes of the fuel cells 611 that may be caused by the condensed water E, thereby improving the durability of the fuel cell system. In addition, the second bypass channel 627b may prevent the air A from being discharged to the outside without reaching the fuel cells 611, thereby improving the efficiency of the fuel cell system.

As set forth above, the fuel cell stack, according to the exemplary embodiments of the present disclosure, includes the bypass channel that is designed to discharge the condensed water to the outside of the fuel cell stack, and the bypass channel has a curved structure to allow a portion of the condensed water to be collected. The condensed water collected in the bypass channel may prevent the reactant gas from being discharged to the outside through the bypass channel, and thus the efficiency of the fuel cell system may be improved.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A fuel cell stack, comprising:
   a cell stacked body in which a plurality of fuel cells are stacked in multiple layers; and
   an end plate by which the plurality of fuel cells are fastened, the end plate including an open end plate disposed at one end of the cell stacked body and a closed end plate disposed at another end of the cell stacked body,
   wherein the open end plate includes a gas inlet delivering a reactant gas supplied from an outside of the fuel cell stack to the cell stacked body, a gas outlet discharging the reactant gas having passed through the cell stacked body to the outside of the fuel cell stack, and a bypass channel connecting the gas inlet to the gas outlet to guide condensed water introduced to the gas inlet to the gas outlet, the bypass channel partially curved to allow the condensed water to be collected.

2. The fuel cell stack according to claim 1, wherein the bypass channel includes one or more valley portions curved to allow the condensed water to be collected.

3. The fuel cell stack according to claim 2, wherein the gas outlet is spaced apart from the gas inlet by a predetermined distance in a direction of gravity, and
   each of the one or more valley portions is concavely curved in the direction of gravity.

4. The fuel cell stack according to claim 3, wherein the bypass channel further includes one or more ridge portions convexly curved in an opposite direction of gravity.

5. The fuel cell stack according to claim 4, wherein each of the one or more ridge portions is positioned between the one or more valley portions or between any one of the one or more valley portions and the gas outlet.

6. The fuel cell stack according to claim 4, wherein the one or more valley portions and the one or more ridge portions are positioned such that an inflection point of a valley portion is spaced apart from an inflection point of a ridge portion by a predetermined distance in the direction of gravity.

7. The fuel cell stack according to claim 3, wherein the bypass channel further includes an inflow channel provided between the gas inlet and the one or more valley portions to guide the condensed water to the one or more valley portions, and an outflow channel provided between the one or more valley portions and the gas outlet to guide the condensed water to the gas outlet.

8. The fuel cell stack according to claim 7, wherein the inflow channel and the outflow channel are downwardly inclined and upwardly inclined, respectively, in the direction of gravity.

* * * * *